(12) United States Patent
Suzuki et al.

(10) Patent No.: US 7,489,087 B2
(45) Date of Patent: Feb. 10, 2009

(54) BACKLIGHT INVERTER AND METHOD OF DRIVING SAME

(75) Inventors: Shinichi Suzuki, Kitasaku-gun (JP); Yoshihito Suzuki, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 11/666,621

(22) PCT Filed: Jun. 7, 2005

(86) PCT No.: PCT/JP2005/010409

§ 371 (c)(1), (2), (4) Date: Apr. 30, 2007

(87) PCT Pub. No.: WO2006/051630

PCT Pub. Date: May 18, 2006

(65) Prior Publication Data

US 2007/0262727 A1    Nov. 15, 2007

(30) Foreign Application Priority Data

Nov. 12, 2004    (JP)    ............................. 2004-329280

(51) Int. Cl.
*H05B 37/02*    (2006.01)

(52) U.S. Cl. ........................ 315/224; 315/219; 315/277; 345/102

(58) Field of Classification Search ............. 315/209 R, 315/220–226, 254, 276–277, 291, 312, 219, 315/246–247, 274; 345/102
See application file for complete search history.

(56) References Cited

U.S. PATENT DOCUMENTS 5,694,007 A * 12/1997 Chen .......................... 315/247

| 6,114,814 | A |  | 9/2000 | Shannon et al. |
| 6,137,234 | A |  | 10/2000 | Willaert et al. |
| 6,633,138 | B2 | * | 10/2003 | Shannon et al. ............. 315/224 |
| 6,936,973 | B2 | * | 8/2005 | Parra et al. ............... 315/209 R |
| 7,038,397 | B2 | * | 5/2006 | Komatsu et al. ........... 315/276 |
| 7,187,139 | B2 | * | 3/2007 | Jin ............................ 315/274 |
| 7,253,565 | B2 | * | 8/2007 | Kang et al. ................. 315/276 |

(Continued)

FOREIGN PATENT DOCUMENTS

EP    1 397 028 A1    3/2004

(Continued)

*Primary Examiner*—David Hung Vu
*Assistant Examiner*—Tung X Le
(74) *Attorney, Agent, or Firm*—Oliff & Berridge, PLC

(57) ABSTRACT

A backlight inverter to light a plurality of CCFLs is provided which supplies a stable clamp current without influence of the CCFL temperature, and which stabilizes the LCD surface brightness immediately from the start of lighting the CCFLs, and a method of driving the backlight inverter is also provided. In a backlight inverter including a plurality of inverter transformers and adapted to light a plurality of CCFLs, two primary windings of each of the inverter transformers are connected in series to each other, and a resonant circuit is formed of a leakage inductance and capacitances at the secondary side of each of the inverter transformers, wherein the inverter transformers are operated at a frequency which is lower than an intermediate frequency between the series resonance frequency and the parallel resonance frequency of the resonant circuit, and which is higher than a frequency at which the phase characteristic curve has its peak.

1 Claim, 8 Drawing Sheets

U.S. PATENT DOCUMENTS

| | | |
|---|---|---|
| 2004/0046512 A1 | 3/2004 | Suzuki et al. |
| 2005/0088113 A1* | 4/2005 | Ushijima et al. ............ 315/276 |
| 2006/0012312 A1* | 1/2006 | Lyle et al. .................. 315/194 |
| 2006/0076907 A1* | 4/2006 | Chen et al. ................. 315/312 |
| 2006/0082330 A1* | 4/2006 | Montante .................... 315/291 |
| 2006/0120109 A1* | 6/2006 | Inoue et al. ................. 362/614 |

FOREIGN PATENT DOCUMENTS

| | | |
|---|---|---|
| JP | A 2000-277361 | 10/2000 |
| JP | A 2001-244094 | 9/2001 |
| JP | A 2003-512710 | 4/2003 |
| JP | A 2003-168585 | 6/2003 |
| JP | A 2004-103316 | 4/2004 |
| JP | A 2004-201457 | 7/2004 |
| WO | WO 01/30121 A1 | 4/2001 |

* cited by examiner

Primary Windings Connected in Series

| Operating Frequency | 45 | 50 | 55 | 60 | 65 | 70 | kHz |
|---|---|---|---|---|---|---|---|
| Fluctuating Time | 0 | 0 | 11 | 18 | 20 | 19 | S |
| Output Voltage 1 | 1.328 | 1.388 | 1.424 | 1.372 | 1.336 | 1.364 | V |
| Output Voltage 2 | 1.360 | 1.424 | 1.464 | 1.408 | 1.372 | 1.404 | V |

Primary Windings Connected in Parallel

| Operating Frequency | 45 | 50 | 55 | 60 | 65 | 70 | kHz |
|---|---|---|---|---|---|---|---|
| Fluctuating Time | 0 | 0 | 15 | 20 | 21 | 11 | S |
| Output Voltage 1 | 1.304 | 1.188 | 1.488 | 1.436 | 1.376 | 1.392 | V |
| Output Voltage 2 | 1.440 | 1.736 | 1.820 | 1.400 | 1.376 | 1.408 | V |

BACKLIGHT INVERTER AND METHOD OF DRIVING SAME

BACKGROUND OF THE INVENTION

1. Field of the Invention

The present invention relates to a backlight inverter to drive a light source of a backlight device for a liquid crystal display, and particularly to a backlight inverter to light a plurality of lamps for a large liquid crystal television, and also to a method of driving the backlight inverter.

2. Description of the Related Art

Recently, a liquid crystal display (hereinafter referred to as LCD) is extensively used as a display device for a personal computer, and the like. The LCD requires a lighting system such as a backlight for illuminating its screen. In order to illuminate such a LCD screen brightly, a plurality of cold cathode fluorescent lamps (hereinafter referred to as CCFL) are used as the light source and are discharged and lit simultaneously.

Generally, at the time of starting discharging a CCFL, a high frequency voltage of about 60 kHz and 1600 V is to be generated out of a DC input voltage of about 12 V at the secondary side of an inverter transformer, and therefore an inverter circuit is employed which includes an inverter unit incorporating a full bridge circuit or a Royer circuit and adapted to drive a backlight. Once the CCFL discharge starts, such an inverter circuit operates to step the voltage at the secondary side of the inverter transformer down to about 600 V which is required for keeping the CCFL discharging. Usually, this voltage control operation is performed by pulse width modulation (PWM).

In some conventional backlight inverter circuits, a resonant circuit is formed of a leakage inductance at the secondary side of a transformer and a parasitic capacitance of a discharge lamp connected as a load, and the primary side of the transformer is driven at the resonance frequency of the resonant circuit (refer to, for example, Patent Document 1).

This drive by the resonance frequency, however, involves a phase difference between voltage and current at the primary side of the transformer and does not necessarily provide good power efficiency. Also, a resonance frequency of a high order is found at the secondary side of the transformer, and it possibly happens that the transformer operates at such a resonance frequency or operates under the influence of such a resonance frequency, thus complicating the transformer designing. And, a CCFL for a backlight undergoes substantial fluctuations of lamp impedance depending on temperature and lamp current, especially immediately after cold starting. The large fluctuation of lamp impedance causes fluctuation in lamp voltage, and consequently the parasitic capacitance formed at the lamp is caused to fluctuate, too.

In order to deal with the difficulties described above, a backlight inverter disclosed in Patent Document 2 is structured with a transformer including a resonant circuit formed of a parasitic capacitance of a discharge lamp, and an H-bridge circuit to drive the primary side of the transformer at a frequency which is lower than the resonance frequency of the resonant circuit and also at which the voltage-current phase difference θ at the primary side of the transformer is kept within a predeterminate range from the minimum point. This enhances the power efficiency of the transformer and also makes the transformer less susceptible to the influences of the frequency of a high order, thus facilitating the transformer designing.

Patent Document 3 discloses a method of driving an inverter, which stabilizes the oscillating operation thereby preventing lamps from flickering and circuit elements from generating noises. This method drives an inverter provided with a step-up transformer which operates such that a DC current is applied to the input winding, the current applied is turned on and off by a switch element, and an alternate voltage is outputted from the output winding, wherein the inverter is driven at a frequency staying out of the frequency range where the input-output voltage phase difference of the step-up transformer is between 50 to 130 degrees. Consequently, the turn number of windings, the air gap, and the degree of coupling are adjusted thus deteriorating the power efficiency, but the fluctuation of the output voltage due to the fluctuation of load impedance is reduced thus stabilizing the oscillation.

Since the driving method described above is adapted for lighting one CCFL or a couple of CCFLs, it is difficult for one backlight inverter to stably light more CCFLs, for example eight to sixteen CCFLs, and the lamp voltages of the individual CCFLs fluctuate causing fluctuation of the currents flowing in the parasitic capacitances of the CCFLs, which makes the brightness unstable causing the screen image of the LCD to flicker.

Also, in a backlight for a large television, a plurality of CCFLs are disposed behind the LCD, and in order to achieve a low cost backlight inverter, the plurality of CCFLs are lit such that a plurality of field effect transistor (FET) bridges, each of which is connected to a plurality of inverter transformers, are driven by one control IC. In such a structure, the CCFL undergoes a substantial fluctuation according to lamp current, especially immediately after cold starting. The substantial fluctuation of lamp impedance leads to fluctuation of lamp voltage, and consequently current flowing in the parasitic capacitance of the CCFL is caused to fluctuate. Thus, at the time of cold starting, even if the control IC of the backlight inverter functions to control the lamp current, the current flowing in the parasitic capacitance is caused to fluctuate due to the fluctuation of the lamp voltage. As a result, the lamp current flowing in the CCFL is not stabilized, and the brightness becomes instable causing the screen image of the LCD to flicker. If the lamp temperature becomes stabilized, then the lamp current is also stabilized thus easing and eliminating the flickering image, but it takes several minutes after start-up before the stabilization is reached, and the stabilization must be reached more rapidly. This flickering problem may be simply solved if the lamp current is controlled by providing one control IC for each of the CCFLs, but this solution approach pushes up production cost of the backlight inverter significantly.

Patent Document 1: U.S. Pat. No. 6,114,814
Patent Document 2: Japanese Patent Application Laid-Open No. 2003-168585
Patent Document 3: Japanese Patent Application Laid-Open No. 2004-201457

SUMMARY OF THE INVENTION

Problems to be Solved

Under the circumstances described above, the present invention has been made with the present invertors' attention directed to the fact that a high power efficiency is achieved at a frequency range where the voltage-current phase difference at the primary side of a transformer is small, and also on the basis of the measurement data showing that in a backlight inverter including a resonant circuit composed of a leakage inductance of an inverter transformer, a parasitic capacitance formed at an LCD, and an additional capacitance, it is preferred to drive an inverter transformer at a frequency intermediate between the series resonance frequency and the parallel resonance frequency of the resonant circuit, and it is an object of the present invention to provide a backlight inverter for driving a plurality of CCFLs, in which a stable lamp current is caused to flow without the influence of the lamp temperature thereby stabilizing the surface brightness of the LCD immediately after the start of lighting the CCFLs, and also to provide a method of driving such a backlight inverter.

MEANS FOR RESOLVING THE PROBLEMS

In order to achieve the object described above, according to one aspect of the present invention, in a backlight inverter for lighting a plurality of CCFLs, each of a plurality of inverter transformers has its primary windings connected in series to each other, and a resonant circuit is formed of a leakage inductance and a composite capacitance at the secondary side of each of the inverter transformers, wherein the inverter transformers are operated at a frequency which is lower than an intermediate frequency between the series resonance frequency and the parallel resonance frequency of the resonant circuit, and which is higher than a frequency where a phase characteristic curve which shows a phase difference between voltage and current at the primary side of the inverter transformer as seen from the primary side of the inverter transformer (hereinafter referred to simply as "phase characteristic curve" or "phase characteristic") has its peak.

In the aspect of the present invention, the series resonance frequency may include: the leakage inductance generated at secondary windings of the inverter transformer; and the composite capacitance composed of an additional capacitance and a parasitic capacitance which are both disposed between the inverter transformer and the CCFL and which are connected in parallel to each other, and the parallel frequency may include: the leakage inductance; a mutual inductance of the inverter transformer; the additional capacitance; and the parasitic capacitance.

In the aspect of the present invention, the CCFLs may be each constituted by either one straight lamp; two straight lamps connected to each other in series so as to form a pseudo U-shaped structure; one U-shaped lamp; or one square U-shaped lamp.

In the aspect of the present invention, the inverter transformer may be connected to both terminals of the CCFL.

According to another aspect of the present invention, there is provided a method of driving a backlight inverter which includes a plurality of inverter transformers and which is adapted to light a plurality of CCFLs. The method includes a step of operating the inverter transformers at a frequency which is lower than an intermediate frequency between the series resonance frequency and the parallel resonance frequency of a resonant circuit including a leakage inductance of the inverter transformer, an additional capacitance and a parasitic capacitance both capacitances disposed between the inverter transformer and the CCFL and connected in parallel to each other, and which is higher than a frequency at which the above-described phase characteristic curve has its peak.

EFFECTS OF THE INVENTION

Since the backlight inverter according to the present invention is adapted to operate at a frequency which is lower than an intermediate frequency between the series and parallel resonance frequencies of the resonant circuit formed at the secondary side of the inverter transformer, and which is higher than a frequency at which the phase characteristic curve has its peak, a stable lamp current flows without undergoing the influence of the lamp temperature, and the surface brightness of the LCD is stabilized immediately after cold starting.

Also, in the backlight inverter according to the present invention, the plurality of FET bridges and inverter transformers are controlled by one control IC for lighting the plurality of CCFLs thus achieving a low cost structure provided with a capability of performing a stable lamp current control (stable brightness of the LCD).

And, in the backlight inverter according to the present invention, since the inverter transformer is driven at the optimal operating frequency, the influence of the parasitic capacitance is reduced, and the uniformity of the lamp currents is enhanced. Consequently, the flickering at the LCD surface is reduced or eliminated.

DETAILED DESCRIPTION OF THE INVENTION

Figure 1:
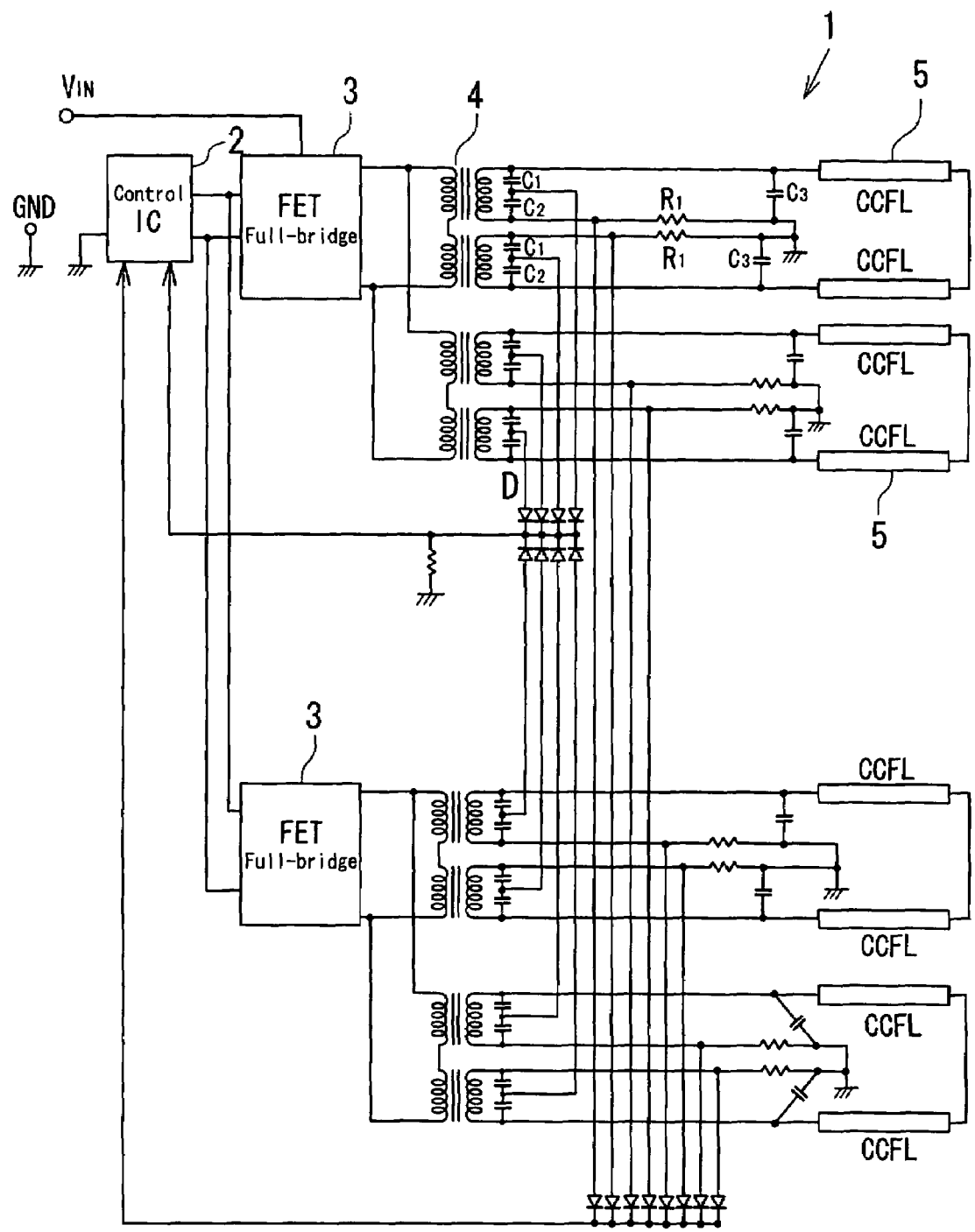
FIG. 1 is a circuit diagram of a backlight inverter according to an embodiment of the present invention.

An exemplary embodiment of the present invention will be described with reference to the accompany drawings.

A backlight inverter 1 according to an embodiment of the present invention is for a large LCD television and includes one control IC 2, a plurality of FET full-bridges 3 activated by the control IC 2, and a plurality of inverter transformers 4 each two of which are connected to one each of the FET full-bridges 3 and each of which is adapted to light two CCFLs 5 connected in series to each other. Thus, the FET full-bridges 3 connected to the control IC2 to control the drive of the CCFLs 5, and the inverter transformers 4 are the main constituent portions of an inverter circuit.

Each of the FET full-bridge 3 is an H-bridge for driving load, composed of two series circuits which each include two FETs, namely a PMOS and an NMOS, and which are connected in parallel to each other, and is connected to the primary sides of two of the inverter transformers 4.

Each of the inverter transformers 4 is a leakage type transformer including two primary windings connected in series to each other and two secondary windings provided corresponding respectively to the two primary windings. A series connected capacitance of capacitors C1 and C2 is connected in parallel to each of the two secondary windings, and one terminal of one secondary winding of the two is connected to one terminal of a series connection of two CCFLs 5 while one terminal of the other secondary winding of the two is connected to the other terminal of the series connection of two CCFLs 5, wherein the two CCFLs 5 connected in series to each other so as to form a pseudo U-shaped structure are driven by one inverter transformer 4.

The respective other terminals of the two secondary windings are each connected via a resistor R1 to ground, and a parasitic capacitor C3 formed at the CCFL 5 is connected between ground and each of the two series connected CCFLs 5. A signal constituted by a voltage divided by the capacitors C1 and C2 of the series connected capacitance connected to each of the secondary windings is fed back to the control IC 2 via a diode D1

The FET full-bridge 3 receives a voltage Vin from a DC power supply and sends out a high frequency voltage to the primary side of the inverter transformer 4 which then steps up the high frequency voltage at its secondary windings, and the boosted voltage is applied to the two CCFLs 5 connected to the secondary windings, thereby discharging and lighting the two CCFLs 5.

Figure 3A:
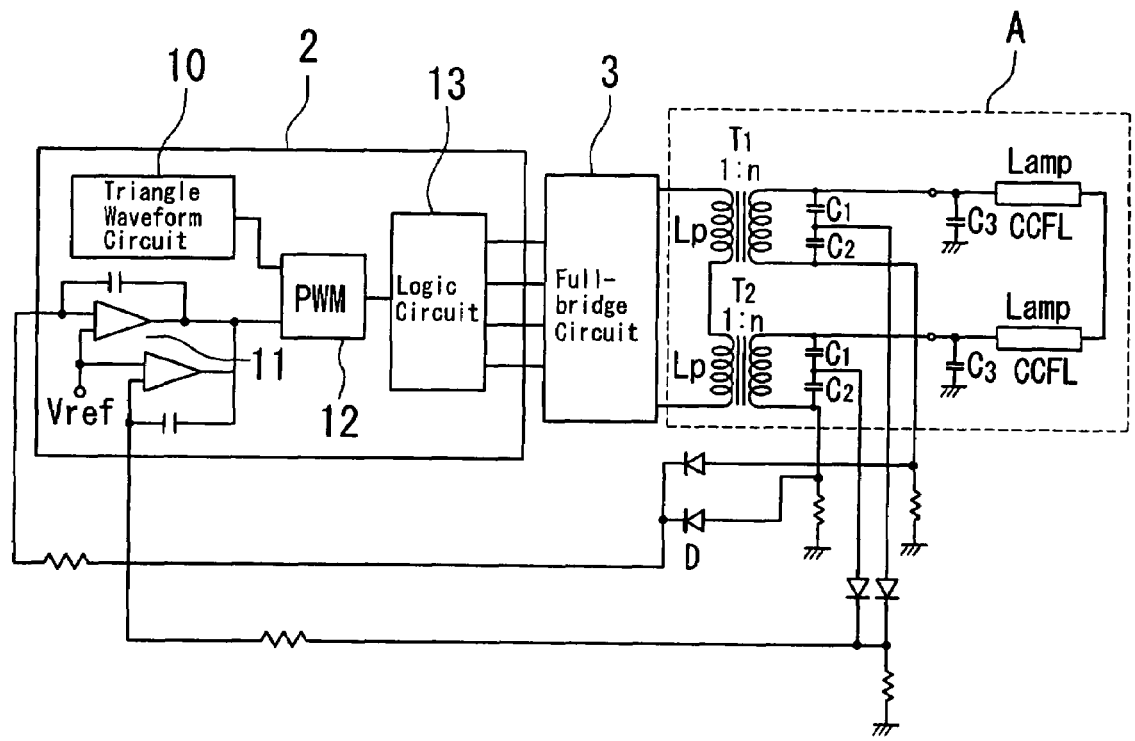
FIG. 3(a) is a detailed circuit diagram of a relevant portion of the backlight inverter of FIG. 1.

Referring to FIG. 3(*a*), the control IC 2 generally includes a triangle waveform circuit (oscillation circuit) 10, an error amplifier circuit 11, a PWM circuit 12, and a logic circuit 13. In the control IC 2, when a triangle waveform output sent from the triangle waveform circuit 10 is inputted to the PWM circuit 12, a current is caused to flow in the CCFLs 5 and then converted into a voltage by a current-voltage converting circuit, and the voltage is inputted to an inverting input terminal of the error amplifier circuit 11. Then, the error amplifier circuit 11 supplies the PWM circuit 12 with an output voltage corresponding to the CCFLs 5, and the PWM circuit 12 compares the output voltage of the triangle waveform circuit 10 with the output voltage of the error amplifier circuit 11 and sends out a pulse signal to the logic circuit 13. The logic circuit 13 supplies a gate signal to the FET full-bridge 3 based on the output pulse signal of the triangle waveform circuit 10 and the output pulse signal of the PWM circuit 12. The FET full-bridge 3 is activated by the gate signal supplied from the logic circuit 13 and causes an AC current to flow in the primary side of the inverter transformer 4, whereby a stepped-up voltage is induced in the secondary windings, and the CCFLs 5 are driven.

In this connection, a signal whose voltage is divided by the capacitors C1 and C2 connected at the secondary side of the inverter transformer 4 is supplied via the diode D1 to the error amplifier circuit 11 and an overvoltage protection circuit (not shown) of the control IC. A voltage across the both terminals of the resistor R1 connected at the secondary side of the inverter transformer 4 is supplied via a diode D2 to the error amplifier circuit 11 of the control IC 2, whereby the lamp current of the CCFLs 5 is feedback-controlled. Also, the control IC 2 is provided with a burst circuit (not shown) which supplies a burst signal to dim the light of the CCFLs 5. An output from this burst circuit constitutes the aforementioned burst signal which pulls up the inverting input of the error amplifier circuit 11 to feedback-control the current of the CCFLs 5 so as to deactivate the primary side of the inverter transformer 4 thereby intermittently driving the CCFLs 5 for dimmer control.

Description will now be made on a method of driving a plurality of CCFLs 5 in the backlight inverter 1 described above.

Figure 2A:
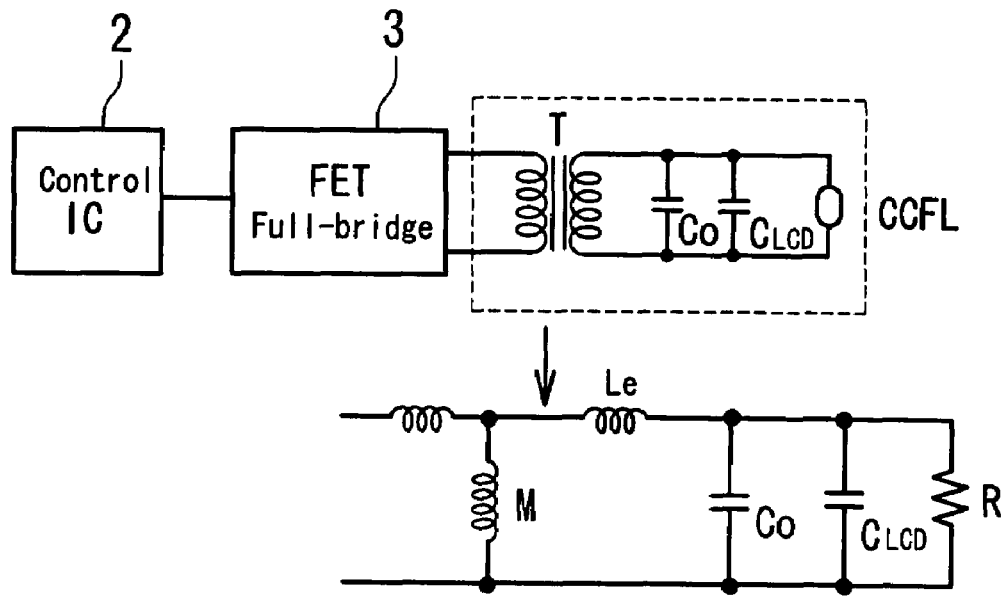
FIG. 2(a) is a circuit diagram of a backlight inverter for lighting one CCFL, accompanied with an equivalent circuit of an inverter transformer portion together with a CCFL.
Figure 2B:
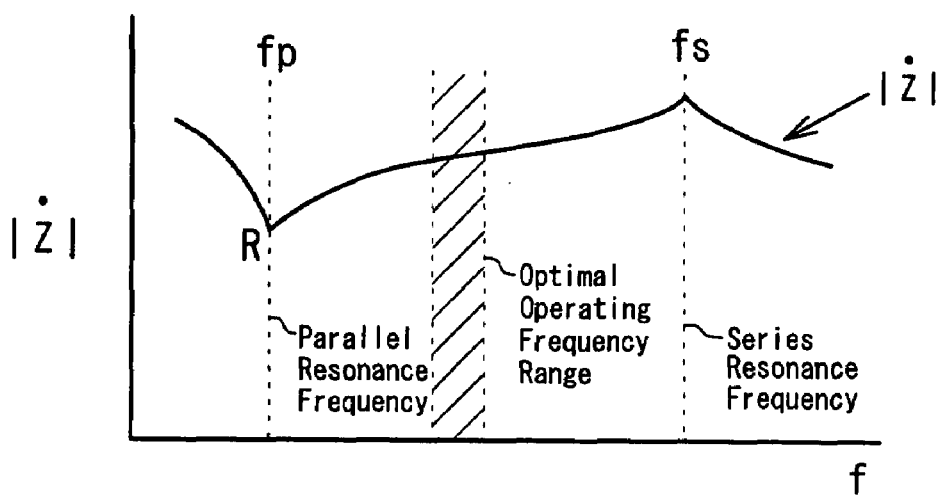
FIG. 2(b) is graph of an impedance characteristic at a secondary side of an inverter transformer of the backlight inverter of FIG. 2(a)

FIG. 2(*a*) is a circuit diagram of a backlight transformer for driving one CCFL, accompanied with an equivalent circuit of an inverter circuit portion of the backlight transformer, together with a CCFL. In the circuit diagram, T is an inverter transformer, $C_O$ is an additional capacitance of the inverter circuit, $C_{LCD}$ is a parasitic capacitance of the inverter circuit, and CCFL is a cold cathode fluorescent lamp for a backlight. In the equivalent circuit, M is a mutual inductance, L is a secondary side leakage inductance, and R is a lamp impedance.

In the inverter circuit, a resonant circuit is composed of a leakage inductance generated at a secondary winding of the inverter transformer T, a winding of the transformer T, and a parasitic capacitance formed at the LCD backlight, and therefore a series resonance frequency fs is given by the leakage inductance Le, and a composite capacitance of the additional capacitance $C_o$ plus the parasitic capacitance $C_{LCD}$, and a parallel resonance frequency fp is given by the mutual inductance M, the leakage inductance Le, and the composite capacitance $C_O + C_{LCD}$.

Referring to FIG. 2(*b*) showing the impedance characteristics of the secondary side of the inverter transformer, it is generally said that an inverter transformer can be optimally driven at a frequency found intermediate between the series resonance frequency fs and the parallel resonance frequency fp, and accordingly the optimal operating frequency range is determined as indicated by the shaded area in the figure.

FIGS. 4 to 8 show gain characteristics and phase characteristics measured by an impedance analyzer for the purpose of determining an optimal driving frequency of the inverter transformer. The measurement results show that respective intermediate frequencies between the series and parallel resonance frequencies fs and fp of the gain characteristics are found at around 53 kHz, and respective minimum points of the phase characteristic are found at around 40 kHz.

Figure 4:
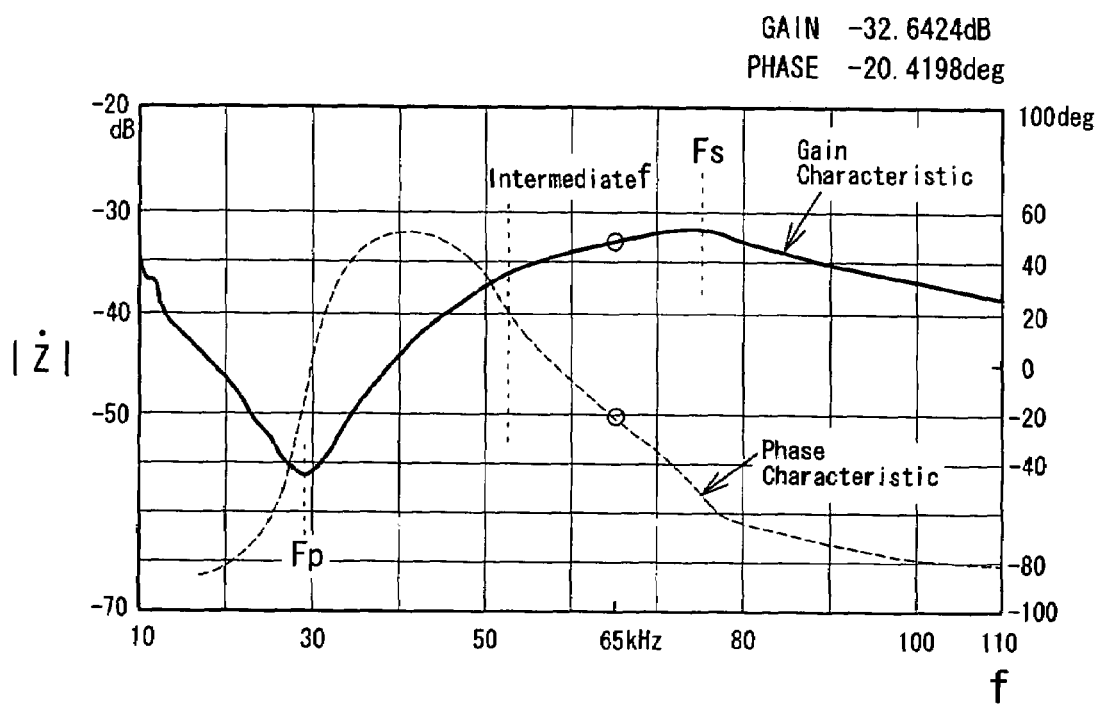
FIG. 4 is a graph of a gain characteristic and a phase characteristic of the backlight inverter of FIG. 1, achieved setting an optimal operating frequency at 65 kHz as marked therein.
Figure 5:
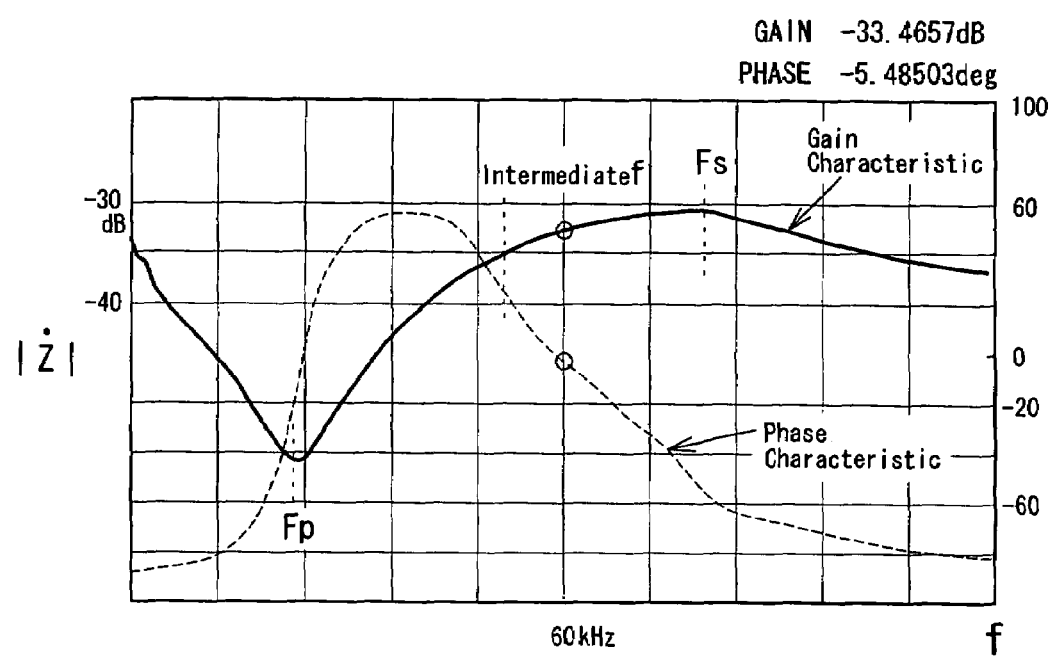
FIG. 5 is a graph of a gain characteristic and a phase characteristic of the backlight inverter of FIG. 1, achieved by setting an optimal operating frequency at 60 kHz as marked therein.
Figure 6:
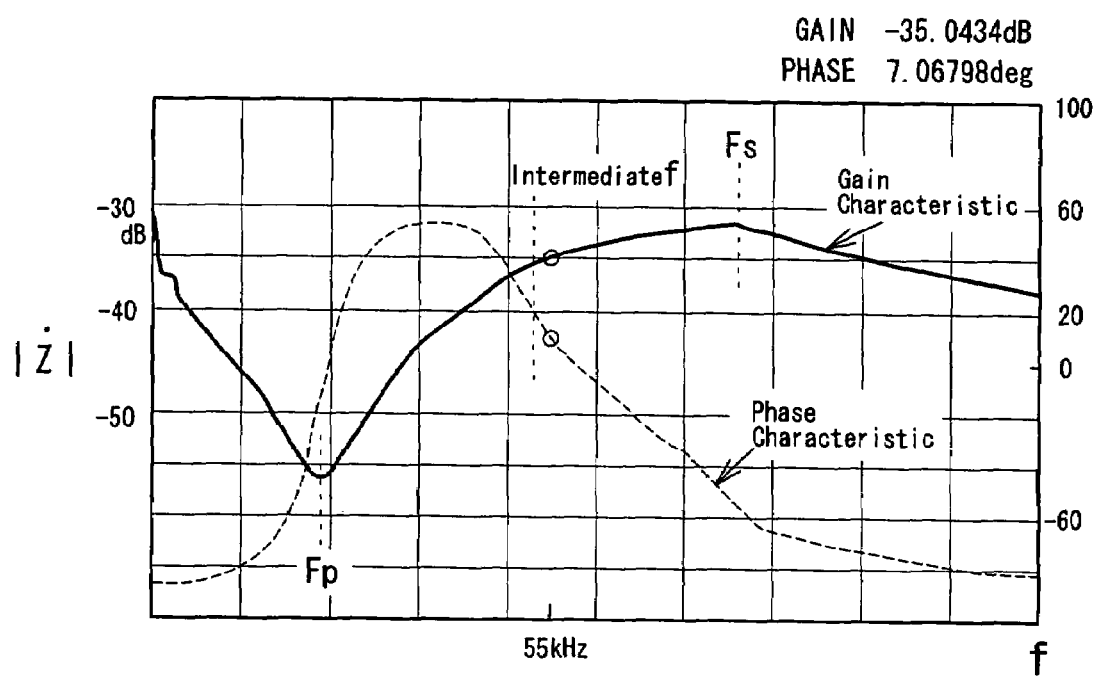
FIG. 6 is a graph of a gain characteristic and a phase characteristic of the backlight inverter of FIG. 1, achieved by setting an optimal operating frequency at 55 kHz as marked therein.
Figure 7:
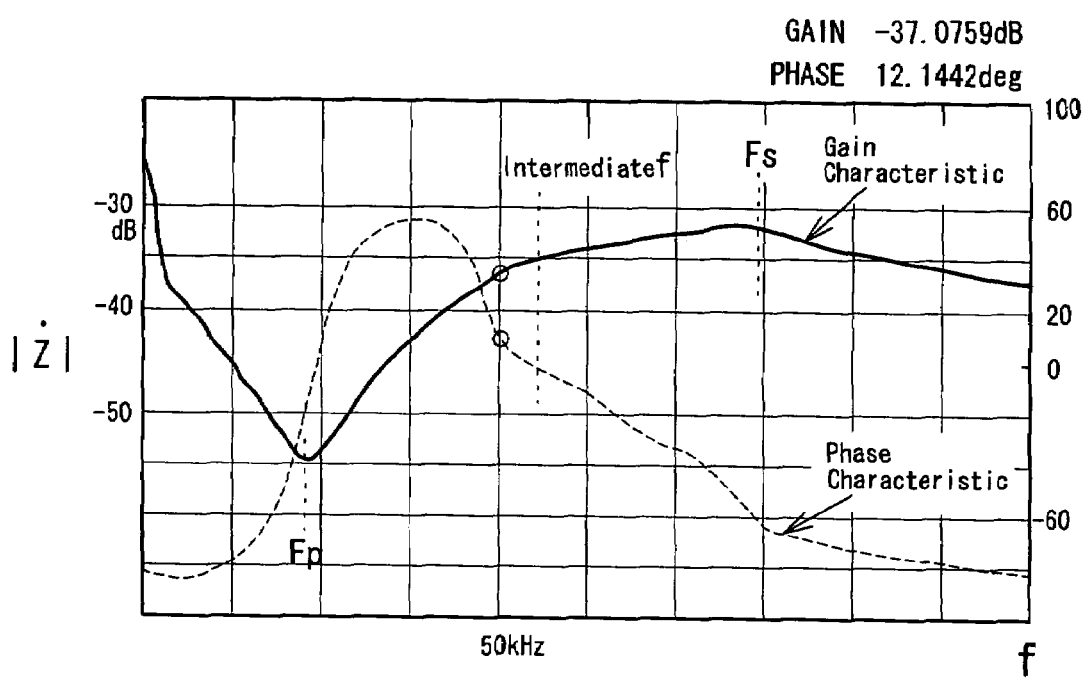
FIG. 7 is a graph of a gain characteristic and a phase characteristic of the backlight inverter of FIG. 1, achieved by setting an optimal operating frequency at 50 kHz as marked therein.
Figure 8:
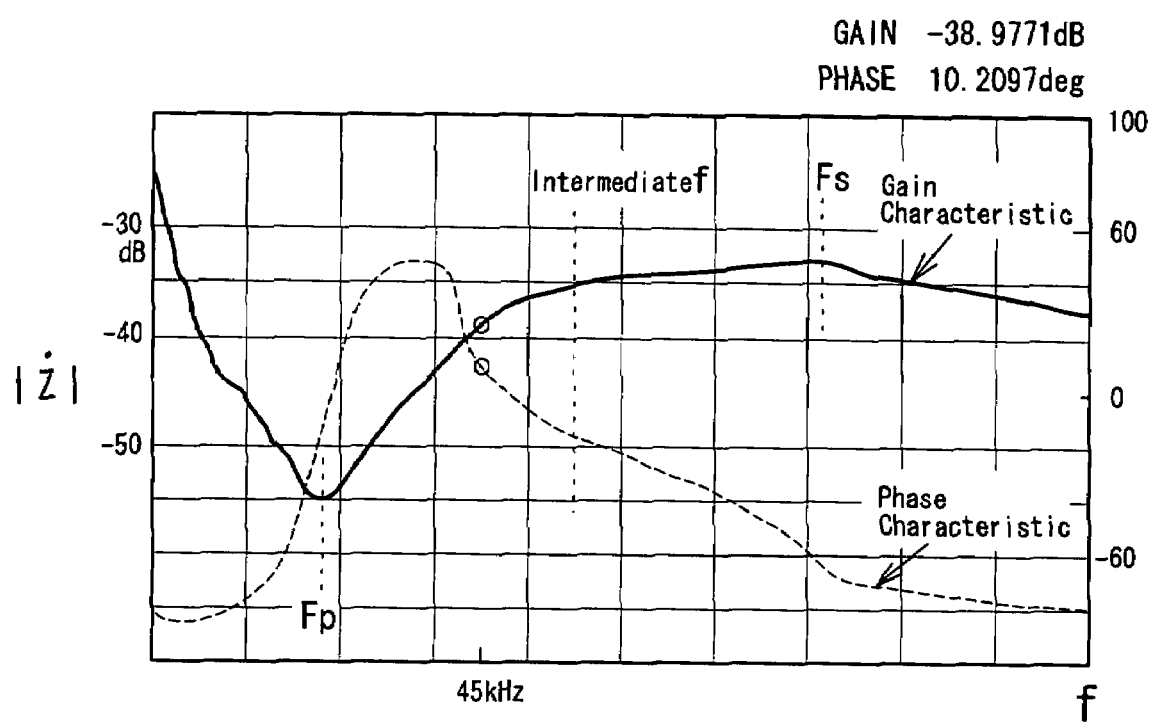
FIG. 8 is a graph of a gain characteristic and a phase characteristic of the backlight inverter of FIG. 1, achieved by setting an optimal operating frequency at 45 kHz as marked therein.

FIG. 4 shows a gain characteristic of −32.6424 dB and a phase characteristic of −20.4198 deg at a frequency point of 65 kHz marked; FIG. 5 shows a gain characteristic of −33.4857 dB and a phase characteristic of −5.48503 deg at a frequency point of 60 kHz marked; FIG. 6 shows a gain characteristic of −35.0434 dB and a phase characteristic of 7.06798 deg at a frequency point of 55 kHz marked; FIG. 7 shows a gain characteristic of −37.0759 dB and a phase characteristic of 12.1442 deg at a frequency point of 50 kHz marked; and FIG. 8 shows a gain characteristic of −38.9771 dB and a phase characteristic of 10.2097 deg at a frequency point of 45 kHz marked.

Figures 9A, 9B:
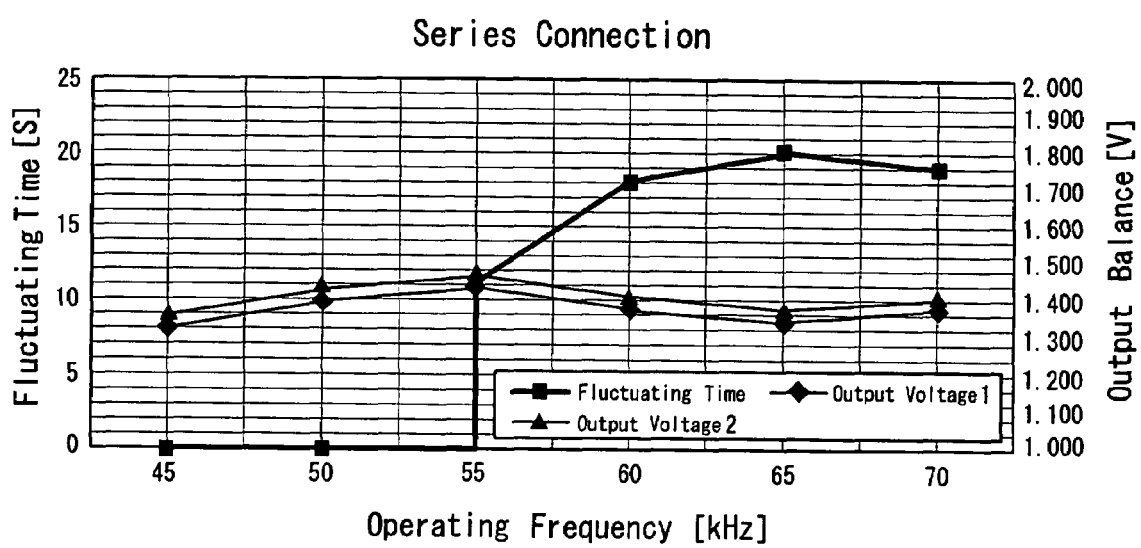
FIG. 9(a) is a table of quantified characteristics achieved at several operating frequencies in case of primary windings connected in series to each other.
FIG. 9(b) is a plot graph of the characteristics quantified.
Figures 10A, 10B:
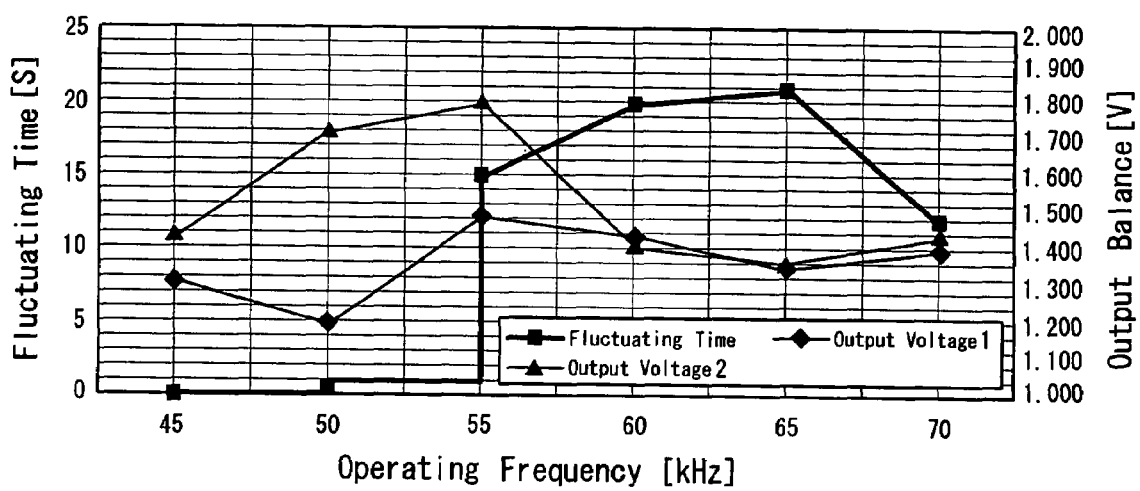
FIG. 10(a) is a table of quantified characteristics achieved at several operating frequencies in case of primary windings connected in parallel to each other.
FIG. 10(b) is a plot graph of the characteristics quantified.

FIG. 9(*a*) shows fluctuating times (seconds), and output voltages 1 and 2 (volts) at operating frequencies of 45 kHz, 50 kHz, 55 kHz, 60 kHz, 65 kHz and 70 kHz when the primary windings of an inverter transformer are connected to each other in series, and FIG. 9(b) shows the aforementioned characteristics represented in a graph Also, FIG. 10(a) shows fluctuating times (seconds), and output voltages 1 and 2 (volts) at operating frequencies of 45 kHz, 50 kHz, 55 kHz, 60 kHz, 65 kHz and 70 kHz when the primary windings of an inverter transformer are connected to each other in parallel, and FIG. 10(b) shows the aforementioned characteristics represented in a graph.

The fluctuating times, and the output voltages 1 and 2 at the operating frequencies 45, 50, 55, 60 and 65 kHz in FIG. 9(a)/9(b) correspond to the graphs of FIGS. 8, 7, 6, 5 and 4, respectively. As shown in FIG. 9(b), the fluctuating time is substantially zero at operating frequencies of 55 kHz or less thus causing no flickering of the CCFLs, and the output voltages have a slight fluctuation. On the other hand, referring to FIG. 10(b), while the fluctuating time is also substantially zero at operating frequencies of 55 kHz or less thus indicating a stable condition, the output voltages are caused to fluctuate considerably.

According to the data described above, it turns out that in a backlight inverter with the primary windings of an inverter transformer connected in series to each other, there is no fluctuating time incurred and only a slight fluctuation is observed in output voltages at operating frequencies of 45 kHz to 55 kHz, and consequently CCFLs are lit without flickering.

Figure 3B:
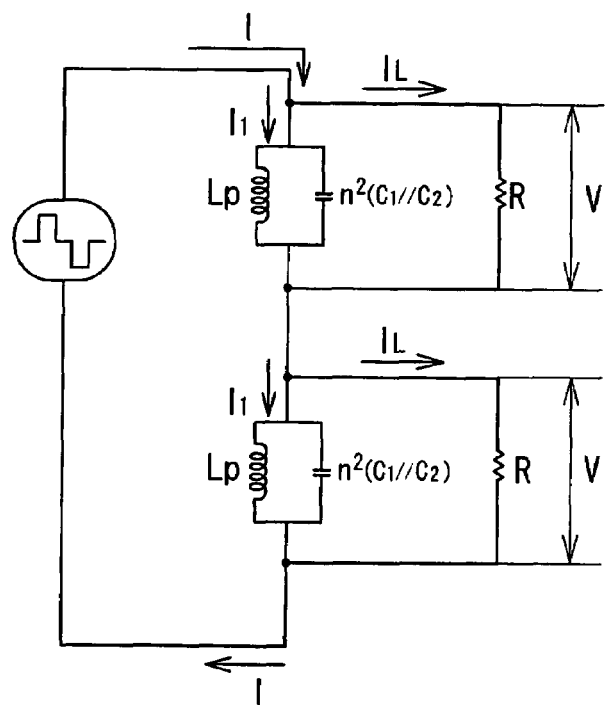
FIG. 3(b) is an equivalent circuit of a portion A of FIG. 3(a), representing an inverter transformer and two CCFLs with indication of current flow directions.

The rationale behind this will be explained as follows. FIG. 3(b) shows an equivalent circuit of a portion A (the inverter transformer 4 [$T_1+T_2$] and the CCFLs 5) of FIG. 3(a) as seen from the primary side of the inverter transformer 4, where C1 is an auxiliary capacitance, C3 is a parasitic capacitance of the CCFL 5, R is an impedance of the CCFL 5, I is a current at the primary side of the inverter transformer 4, $I_1$ is a shunt current flowing in the Lp and $n^2$(C1//C2), $I_L$ is a current flowing in the CCFL 5, and V is a lamp voltage. On the assumption of "Lp<<$n^2$(C1//C2)", the current I applied to the primary side of the inverter transformer 4 is the vector sum of the currents $I_1$ and $I_L$, and so it can be comprehended from the equations "$I_L=I\sqrt{(I^2-[\omega(C1//C2)\times V]^2}$" and "$\omega=2\pi f$" that with a smaller value of f, the current $I_L$ exhibits a smaller fluctuation in response to the fluctuation of the voltage V.

Thus, a smaller f value is preferred as an operating frequency, but the inverter is caused to operate unstably below a frequency at which the phase characteristic has its minimum. And, since the best power efficiency (power factor) as the inverter transformer is achieved at a frequency where the phase characteristic has its minimum, it is advisable to operate the inverter around the frequency.

Accordingly, in the present invention, the optimal operating frequency for driving a backlight inverter is set below an intermediate frequency between the series resonance frequency fs and the parallel resonance frequency fp of the resonant circuit of the inverter transformer, and at the same time is set above a frequency at which the phase characteristic curve has its peak.

As is clear from the foregoing discussion, the present invention is based on the fact that a series resonance frequency fs composed of a leakage inductance, a parasitic capacitance and an additional capacitance, and a parallel resonance frequency fp composed of a mutual inductance, a leakage inductance, a parasitic capacitance and an additional capacitance are found at the secondary side of an inverter transformer, and that according to the gain-phase characteristics as seen from the primary side of the inverter transformer, a frequency at which the minimum phase occurs is located below the intermediate frequency between the series and parallel resonance frequencies fs and fp. And, since the current at the secondary side of the inverter transformer is the vector sum of the parasitic capacitance, the additional capacitance, and the lamp impedance, the operating frequency needs to be brought closer to the parallel resonance frequency fp in order to make the lamp current less susceptible to the fluctuation of the parasitic capacitance. Consequently, the inverter transformer is operated at a frequency lower than the intermediate frequency between the series and parallel resonance frequencies fs and fp.

The inverter is caused to operate unstably below a frequency at which the minimum phase is observed in the phase characteristic, and therefore is operated above a frequency at which the phase characteristic has its minimum. And, the inverter transformer operates most efficiently at a frequency where the phase characteristic has its minimum, and it is essential in terms of the efficiency of the inverter to set the operating frequency above the aforementioned frequency corresponding to the minimum of the phase characteristic.

Thus, in the present invention, the primary windings of an inverter transformer are connected to each other in series and connected to one of a plurality of FET full bridges, and the FET full bridges are operated by one control IC, whereby a plurality of CCFLs connected to the secondary side of the inverter transformer can be lit in a stable manner.

In the embodiment described above, two CCFLs are connected in series to each other so as to form a pseudo U-shaped structure, but the present invention is not limited to such a structure of CCFLs and can be carried out together with one U-shaped or square U-shaped CCFL, or alternatively one straight CCFL with its both electrodes connected to the inverter transformer.

What is claimed is:

1. A method of driving a backlight inverter comprising a plurality of inverter transformers and adapted to light a plurality of cold cathode fluorescent lamps, the method comprising a step of operating the inverter transformers at a frequency which is lower than an intermediate frequency between a series resonance frequency and a parallel resonance frequency of a resonant circuit comprising a leakage inductance of the inverter transformer, an additional capacitance and a parasitic capacitance both capacitances disposed between the inverter transformer and the cathode fluorescent lamp and connected in parallel to each other, and which is higher than a frequency where a phase characteristic curve, which shows a phase difference between voltage and current at a primary side of the inverter transformer as seen from the primary side of the inverter transformer, has its peak.

* * * * *